No. 746,761. PATENTED DEC. 15, 1903.
C. L. TAYLOR.
CLUTCH OPERATING MECHANISM.
APPLICATION FILED APR. 17, 1903.
NO MODEL. 2 SHEETS—SHEET 1.
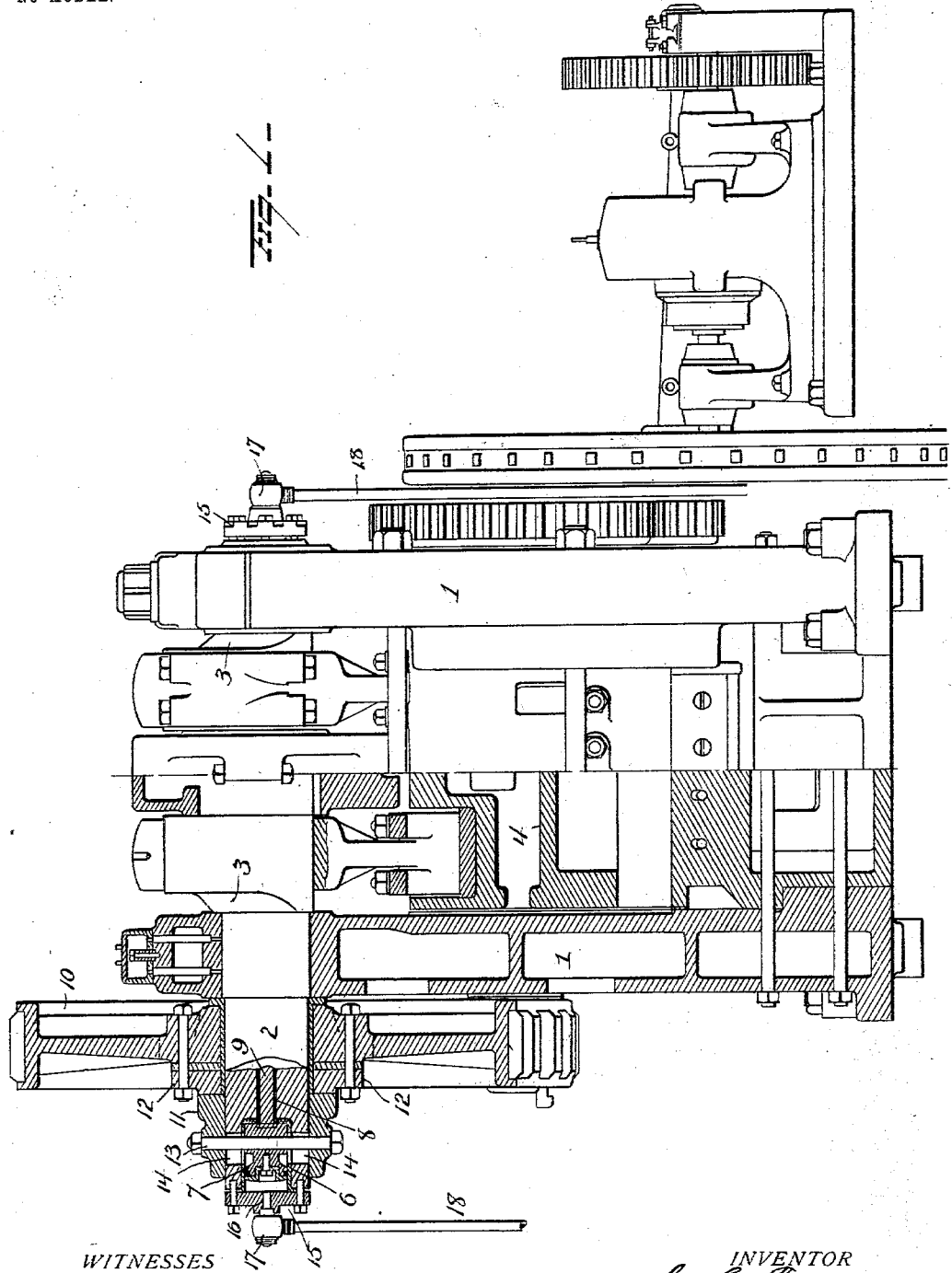
WITNESSES
INVENTOR
C. L. Taylor
By H. A. Seymour
Attorney

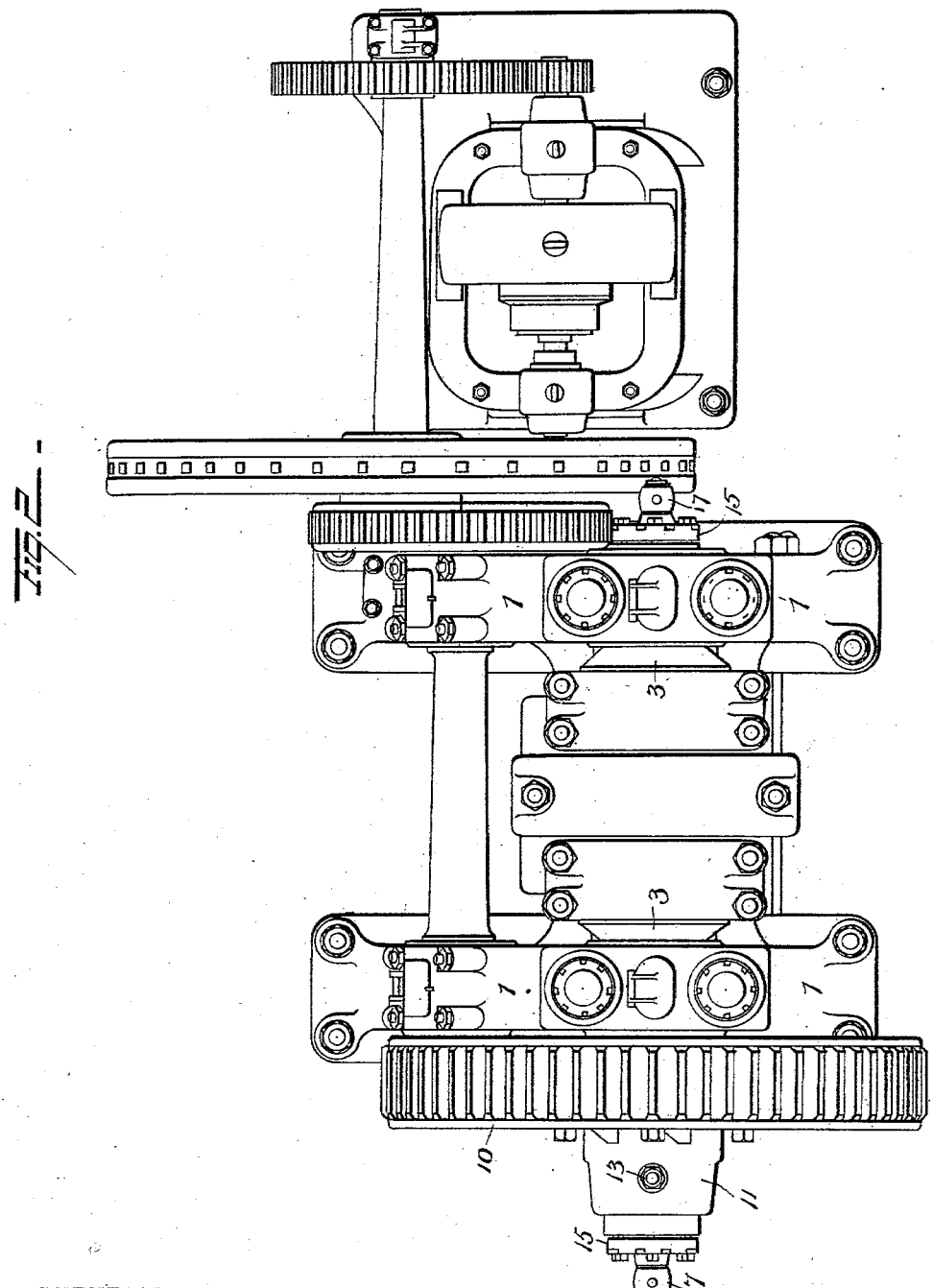

No. 746,761.

Patented December 15, 1903.

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

CLUTCH-OPERATING MECHANISM.

SPECIFICATION forming part of Letters Patent No. 746,761, dated December 15, 1903.

Application filed April 17, 1903. Serial No. 153,129. (No model.)

*To all whom it may concern:*

Be it known that I, CLARENCE L. TAYLOR, of Alliance, in the county of Stark and State of Ohio, have invented certain new and useful Improvements in Clutch-Operating Mechanism; and I do hereby declare the following to be a full, clear, and exact description of the invention, such as will enable others skilled in the art to which it appertains to make and use the same.

My invention relates to an improvement in clutch-operating mechanism for heavy machinery, the object being to provide fluid-operated devices under the control of the operator for positively shifting the clutch in both directions; and it consists in the parts and combination of parts, as will be more fully described, and pointed out in the claims.

In the accompanying drawings, Figure 1 is a view, partly in front elevation and partly in longitudinal vertical section, of a bloom-shear embodying my invention; and Fig. 2 is a plan view of the same.

1 represents the frame of the machine, carrying the shaft 2, having eccentrics 3, which latter actuate the carrying-frame 4 of the shear blade or cutter 5.

While I have shown the improvement in connection with bloom-shears, I would have it distinctly understood that I do not confine its application to such machines, but consider myself at liberty to apply the improvements to any and all machines where such mechanism could be advantageously used.

The shaft 2 is journaled in the sides of the frame and is provided at its ends with recesses 6, preferably cylindrical in shape and forming cylinders in which pistons 7 (only one of which is shown) rest and move. The two cylinders or recesses 6 thus formed in the ends of the shaft are connected by a bore 8, extending lengthwise through the shaft, for the passage of the rod 9, which latter is connected at its ends to the two pistons, so that when one piston is moved inwardly by the pressure of the fluid against same the other will be moved outwardly.

One end of shaft 2 projects some distance beyond the frame, and this projecting end carries the pinion 10 and clutch 11. The pinion is loosely mounted on the shaft 2, while the clutch 11 is keyed to the shaft 2, so as to revolve therewith, but is free to slide thereon. This clutch is in the form of a sleeve having teeth which engage teeth on the hub 12 of pinion 10, and it carries the transverse bolt 13, which passes through an oblong slot 14 in the shaft 2 and through the adjacent piston 7. From this it is evident that if either piston 7 be moved longitudinally within its cylinder, the clutch will also be moved toward or away from pinion 10. The piston at the opposite end of the shaft is exactly like that shown in section in Fig. 1, except that it is not slotted for the passage of a bolt.

The outer ends of both cylinders are closed by the heads 15, bolted to the ends of the shaft, and each head is provided centrally with an opening 16, with which the coupling 17 communicates. A part of each coupling turns with the shaft, while the parts to which the pipes 18 are connected remain stationary. These pipes are connected to a common source of fluid-supply (and by "fluid" I include steam, air, and water) and to exhaust-pipes and are provided with a valve of any of the well-known forms whereby the fluid-supply can be cut off or the valve turned to admit the supply to either cylinder 6 and open the other cylinder to the exhaust. Hence by turning the valve to one position the fluid enters one cylinder while the other is opened to the exhaust, thus permitting the two connected pistons to move in the direction of the applied pressure and either causing the clutch to engage or disengage the pinion, and by reversing the valve fluid will be caused to enter the other cylinder and be discharged from the one previously acted upon.

The pistons 7 and the rod 9 being within and carried by the shaft 2 necessarily revolve with the shaft, and as they are connected to the clutch by a through-bolt the parts are always in a position to actuate the clutch, irrespective of the position of the shaft.

It is evident that many slight changes might be resorted to in the relative arrangement of parts herein shown and described without departing from the spirit and scope of my invention. Hence I would have it understood that I do not wish to confine myself to the exact construction herein shown and described; but, Having fully described my invention, what I claim as new, and desire to secure by Letters Patent, is—

1. In a clutch-operating device, the combination with a shaft, a clutch slidingly mounted on the shaft, and a pinion loose thereon, of connected pistons mounted in recesses in the ends of the shaft, means for applying fluid-pressure against either piston and means connecting the clutch-actuating device and the clutch.

2. In a clutch-operating device, the combination with a shaft provided with a cylinder in each end, a pinion loosely mounted on said shaft, and a clutch slidingly mounted on the shaft, of pistons located within the cylinders in the shaft, means connecting the pistons and means connecting the clutch-actuating device and the sliding clutch.

3. In a clutch-operating device, the combination with a shaft provided with recessed ends, a pinion loose on the shaft, and a sliding clutch also on the shaft, of a fluid-supply pipe coupled up to each recessed end of the shaft, a piston in each recess, means connecting the two pistons, and means connecting the clutch-actuating device and the clutch.

4. In a clutch-operating device, the combination with a shaft having recessed ends, a head closing each recess, a pinion loose on the shaft and a clutch slidingly mounted on the shaft, of a piston in each recessed end, a rod passing longitudinally through the shaft and connecting the pistons, and means connecting the clutch-actuating device and the clutch.

In testimony whereof I have signed this specification in the presence of two subscribing witnesses.

CLARENCE L. TAYLOR.

Witnesses:
NORMAN C. FETTERS,
A. L. ROBERTS.